United States Patent Office 3,755,452
Patented Aug. 28, 1973

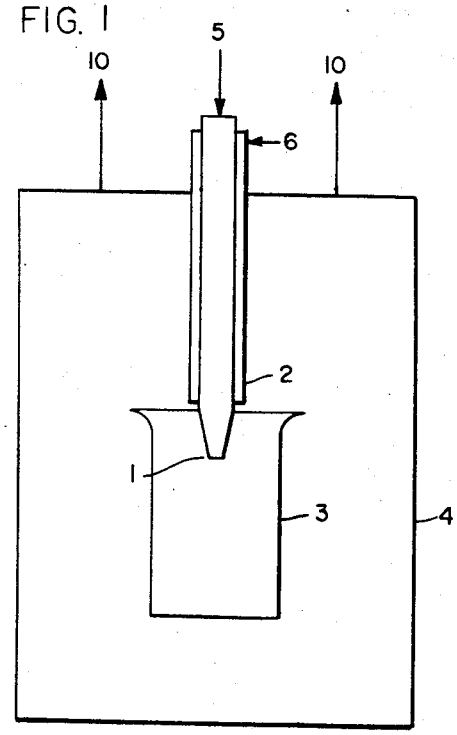
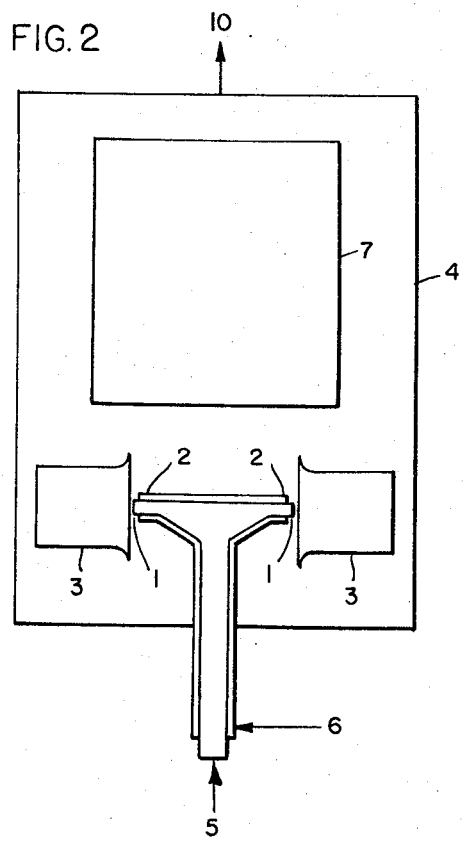
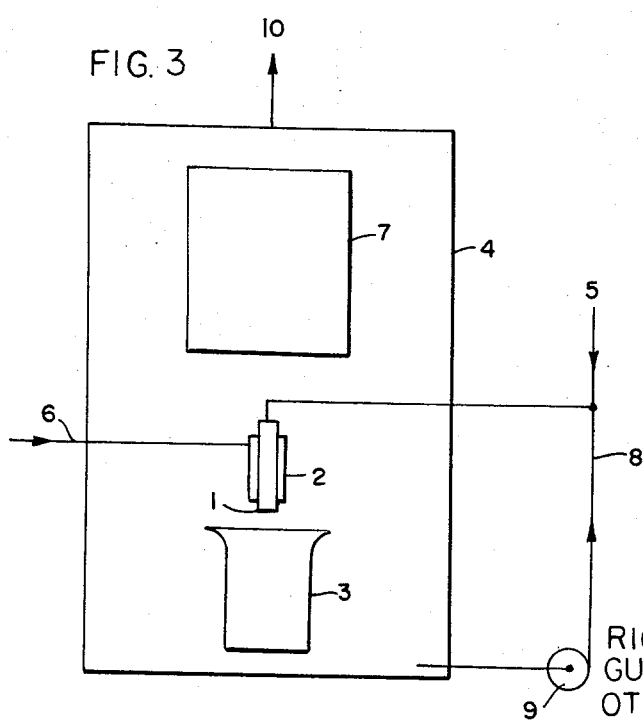

3,755,452
MIXING GASES AND LIQUIDS WITH A LIQUID MEDIUM
Richard Sinn, Ludwigshafen (Rhine), Guenter Herrmann, Mannheim, Otto Nagel, Wachenheim, Pfalz, Hubertus Scheuring, Frankenthal, Pfalz, and Paul Hornberger, Ludwigshafen (Rhine), Germany, assignors to Badische Anilin- & Soda-Fabrik Aktiengesellschaft, Ludwigshafen (Rhine), Germany
Filed Apr. 3, 1967, Ser. No. 627,786
Int. Cl. B01f 5/04; C07c 29/00, 45/02
U.S. Cl. 260—586 B                      11 Claims

ABSTRACT OF THE DISCLOSURE

A process for mixing gases and liquids with a liquid medium in which the gas and the liquid are injected into an impulse exchange chamber which is located in the liquid medium, and apparatus for carrying out the mixing.

---

The invention relates to a new method and a new apparatus for mixing gases and liquids with a liquid medium.

In many chemical reactions in which gases and liquids participate, the mixing process plays a decisive part. Mechanically driven stirring means of very varied construction are generally used for the purpose in industry. Leaks at the stirrer shaft are unavoidable, particularly in the case of reactions carried out under pressure. It is therefore preferred to use apparatus which do not contain any moving parts. Thus the gas is advantageously introduced in fine distribution at the bottom of the vessel so that it bubbles up through the liquid. In order to mix the liquid medium to some extent, the air lift pump principle is often used, positive circulation being achieved for example by providing a concentric tube within a cylindrical reactor, the upwardly bubbling gas partly entraining the liquid medium in the inner chamber of the concentric tube and the liquid medium simultaneously flowing downward in the outer chamber between the concentric tube and the wall of the vessel. This circulation may be intensified for example by injecting the liquid with a high impulse downward in the outer chamber (cf. German patent specification No. 926,846). An intense and rapid mixing of gases and liquids with the liquid medium is not however effected in this way.

It has also been recommended that the gas and liquid should be injected into the liquid medium perpendicularly to the direction of flow thereof. In practice however the liquid medium exhibits a very low speed which is not sufficient to achieve rapid and intense mixing in the absence of stirring means. In many reactions the reaction chamber therefore has to be very high to achieve long mixing periods during which the gas bubbles up through the liquid.

It is an object of this invention to provide a process for mixing gases and liquids with a liquid medium in which intense and rapid mixing takes place and in which a very high reaction chamber is not required. It is another object of this invention to provide an apparatus which does not contain any moving parts but nevertheless makes possible rapid and intense mixing.

These and further objects of this invention will become apparent to those skilled in the art from the following description, appended claims and accompanying drawing in which:

FIG. 1 is a side elevation of an apparatus embodying the invention;

FIG. 2 is a similar view to that of FIG. 1 showing another embodiment of the invention; and FIG. 3 is a similar view to that of FIG. 1 showing still another embodiment of the invention.

Briefly, we have discovered an improved method for mixing gases and liquids with a liquid medium by injecting gases and liquids into a liquid medium in which the gases and the liquids having a velocity of 5 to 100 m./sec. are introduced through nozzles into an impulse exchange chamber in the liquid medium and extending in the direction of entry of the liquid, the inlet opening of said impulse exchange chamber having a mean diameter which is twice to twenty times the mean diameter of the liquid nozzle and having a length which is three to thirty times its hydraulic diameter.

As the gas and liquid enter the impulse exchange chamber, the liquid medium is sucked in and within a fraction of a second is so intensely mixed with the substances supplied that even at the outlet from the impulse exchange chamber practically no difference in concentration can be detected. The mixing effect is particularly marked in the oxidation of hydrocarbons with a gas containing oxygen in the liquid phase, where even local high concentrations of oxygen occurring for short periods of time may result in the formation of resin. Such resin formation practically does not occur in the new method. Whereas a high column of liquid has hitherto been necessary in order to achieve a substantial absorption of the oxygen in the liquid phase, low liquid levels can be used according to this invention because absorption has ended practically upon exit from the impulse exchange chamber. In the conventional method of operation without an impulse exchange chamber, oxygen breaks through even at low gas throughputs, i.e. at small amounts of oxygen supplied per unit of area of the reactor cross-section. The offgas then contains considerable amounts of oxygen. Since the gas phase usually also contains vapors of organic substances, there is the risk of explosions. This does not occur in the new process until much higher gas throughputs are reached.

The new process is suitable in general for mixing gases and liquids with a liquid medium, particularly in carrying out chemical reactions between gases and liquids which require rapid and intense mixing, liquid medium being the reaction mixture which is formed from the gas and liquid in the course of the reaction. Obviously the gas and the liquid may be not only pure substances by any desired mixture of substances, while the liquid medium is in general a mixture of substances, e.g. a mixture of liquid and gas. Special advantages are achieved in the oxidation of organic compounds with oxygen or gases containing oxygen, such as air, and the oxidation of aliphatic, cycloaliphatic and arylaliphatic hydrocarbons, such as paraffins, cyclohexane or xylene, is of particular importance. When using the new process for the said oxidation reactions, the reaction conditions which are usually observed (such as catalysts, pressure, temperature and degree of oxidation) are not affected. The more rapid and more intense mixing due to the new process may however influence the rate of reaction, so that it may be advisable to re-optimize the process parameters, such as mean residence amount of catalyst (which have proved to be optimum in an industrial process) on the basis of the new higher rate of reaction. The new process permits the carrying out of many oxidation reactions at somewhat lower temperatures and often gives higher yields of reaction products. The proces according to this invention is of particular importance for commercial processes in which very large volumes have to be mixed continuously.

An essential feature of the new process is a velocity of the liquid of about 5 to 100 m./sec., preferably 10 to 30 m./sec. Such velocities are achieved by injection through nozzles, and examples of suitable nozzles are round nozzles, slot nozzles or annular nozzles. Gases and liquids may emerge together from one nozzle and the two substances may be united immediately prior to entering the nozzle or in a mixing zone provided upstream of the nozzle. Gases and liquids may however also be introduced through separate nozzles and the direction of entry and the velocity of the gas may be varied at will. The said velocity is in general 3 to 30 m./sec. The new process is particularly suitable for mixing operations in which the ratio of the volume of liquid supplied to the volume of gas supplied is from 0.1:1 to 10:1.

The impulse exchange chamber should have a mean diameter of the inlet opening which is twice to twenty times, preferably twice to ten times, the mean diameter of the liquid nozzle and whose length is three to thirty times, preferably five to fifteen times, its hydraulic diameter. The liquid nozzle is the outlet opening for the liquid or, when gas and liquid are supplied through a common nozzle, the common outlet opening. The mean diameter is the diameter of a circle having the same area as the cross-section of the nozzle or inlet opening of the impulse exchange chamber. The impulse exchange chamber in general has a constant cross-section or one which increases in the direction of flow. The impulse exchange chamber should extend in the direction of entry of the liquid and may vary in shape, the shape being advantageously adapted to the shape of nozzle used. In general tubes are used which are cylindrical or segments of cones. When the impulse exchange chamber is a cylindrical tube, its length should be three to thirty times its diameter. When the impulse exchange chamber does not have a circular cross-section or one which is constant over its length, its length should be three to thirty times the hydraulic diameter. Hydraulic diameter is defined as the diameter of a cylindrical tube which, for the same length and the same amount passed through it exhibits the same pressure loss as the impulse exchange chamber in question.

Instead of one nozzle for the gas and liquid and one impulse exchange chamber associated therewith, it is possible to use a plurality of nozzles and a plurality of associated impulse exchange chambers, nozzles of the same size advantageously being used. The nozzles and the associated impulse exchange chambers may be arranged in any relative position in the reaction vessel and may for example together form a star or spherical star shape. It is also possible to combine a plurality of nozzles with one impulse exchange chamber, the cross-section of the inlet opening of the impulse exchange chamber when using $n$ nozzles being $n$ times the cross-section required for one nozzle. For example when using a plurality of nozzles in star formation, an annular gap arranged rotation-symmetrically to the central axis of the nozzle star is suitable as the impulse exchange chamber. The same annular gap impulse exchange chamber is also suitable when using radially directed annular nozzles (as shown in FIG. 2 of the accompanying drawings). In practice the volume of the impulse exchange chamber is only a minimal portion of the actual reaction chamber, in general about a one-hundredth to one-hundredth to one-hundredthousandth part. To achieve good convection in the reaction chamber and to avoid deposits on the bottom it is advantageous to arrange nozzle and impulse exchange chamber in the middle of the reaction chamber directed vertically downward. The air lift principle is also often used additionally, a concentric cylindrical tube in the middle of the cylindrical reaction vessel producing a forced circulation in which the liquid medium (specifically lighter because of its gas content) flows upwardly in the outer (or inner) space and after substantial separation of the gas phase from the liquid phase, the liquid phase then flows downwardly in the inner (or outer) space. Provision is advantageously made by guide plates in the reaction chamber that the mixture leaving the impulse exchange chamber is guided so that the air lift principle is promoted and not disturbed, i.e. by conducting the mixture leaving the impulse exchange chamber only into the outer (or inner) space.

The accompanying drawings illustrate the invention. For better understanding, however, the size of the nozzles and impulse exchange chambers is greatly exaggerated in relation to the reaction chamber. The same reference numerals are used in each of the three figures, all of which show diagrammatically embodiments of the invention.

1 denotes the outlet opening for the liquid, 2 denotes the outlet opening for the gas, 3 the impulse exchange chamber, 4 the reaction vessel (mixing vessel), 5 and 6 the feed supply for liquid and gas, 7 the circulation tube, 8 the supply for liquid medium removed through pump 9 and recirculated, and 10 the discharge line for the mixture.

FIG. 1 shows a tubular impulse exchange chamber 3 extending vertically downward in the reaction vessel 4. The liquid fed into the reactor is supplied through the nozzle opening 1 and the gas through the opening 2 to the impulse exchange chamber. Reaction mixture is thus sucked from the reaction vessel into the impulse exchange chamber. The mixture formed leaves the reactor through the discharge lines 10.

FIG. 2 shows a radially directed annular nozzle associated with an annular impulse exchange chamber.

FIG. 3 shows a downwardly directed nozzle. Liquid medium is withdrawn from the mixing vessel and supplied through pump 9 and line 8 to the nozzle opening 1 together with the liquid through line 5. This method is specially to be recommended when long residence times are required and at the same time intense mixing has to be ensured in the reaction vessel.

Various modifications and alterations may be made by those skilled in the art on the basis of the foregoing description and the accompanying drawings without departing from the scope and spirit of this invention, and it should be understood that this invention is not to be limited unduly to those preferred embodiments set forth herein for illustrative purposes.

The invention is also illustrated by the following example.

EXAMPLE 9 cubic meters of cyclohexane and 500 cubic meters (STP) of air are supplied per hour to a reactor (similar to that shown in FIG. 3 but without items 8 and 9) having a capacity of 4 cubic meters and in which a circulating tube having a length which is two-thirds the height of the reactor and a diameter which is 70% of the diameter of the reactor is arranged concentrically. The pressure is 20 atmospheres absolute and the temperature is 145° C. The oxidation is carried out in the presence of 3 p.p.m. of cobalt as catalyst in the form of cobalt naphthenate. The diameter of the cyclohexane nozzle (1 in FIG. 3) is 13.5 mm. and the cyclohexane leaves the nozzle at a velocity of 20 m./sec.

The impulse exchange chamber 3 has a diameter of 80 mm. and a length of 640 mm. The oxygen content of the offgas leaving the reactor through line 10 is 0.2% by volume.

When using the same conditions but dispensing with an impulse exchange chamber it is only possible to charge the reactor with 200 cubic meters (STP) of air in order that the oxygen content of the offgas should not exceed the value of 0.2% by volume dictated by reasons of safety. If the reactor having an impulse exchange chamber be charged with 200 cubic meters (STP) per hour of air with the other conditions being the same, the yield of desired products (cyclohexanone and cyclohexanol) is 2% higher with reference to reacted cyclohexane than when operating without the impulse exchange chamber.

We claim:

1. A process for mixing a gas and a liquid with a liquid medium which comprises injecting a gas and liquid simultaneously into a body of said liquid medium contained within a reaction chamber, at a velocity of said liquid of 5 to 100 meters per second through at least one nozzle into the inlet end of an impulse exchange zone consisting of a tubular member submerged in said body of said liquid medium, said tubular member having an open inlet end and an open outlet end and being of substantially constant cross-section or flaring in the downstream direction, the latter with reference to the axis thereof in the direction of entry of said liquid into said tubular member, the volume of said impulse exchange zone being $1/100$ to $1/100,000$ of the volume of the reaction chamber, the mean diameter of the inlet opening of said tubular member being twice to twenty times the mean diameter of said nozzle for said liquid and the length, measured in said downstream direction, of said tubular member being three to thirty times its hydraulic diameter.

2. A process as claimed in claim 1 wherein a circulation tube having a vertical longitudinal axis is immersed in said body of liquid above said zone, and providing liquid circulation in said reaction chamber of said liquid by directing flow of the liquid medium discharged from the outlet end of said tubular member and containing bubbles of said gas about the outer side or through the interior of said circulation tube.

3. A process as claimed in claim 2 wherein said impulse exchange zone has a vertical longitudinal axis and said liquid medium containing said bubbles rises from said zone through the interior of said circulation tube.

4. A process as claimed in claim 2 wherein said gas and said liquid are injected laterally into said body of liquid and said liquid medium containing said bubbles is discharged laterally from the outlet end of said zone and said liquid medium containing said bubbles rises from said outlet end about the exterior of said circulation tube.

5. A process as claimed in claim 1 wherein said zone is a substantially cylindrical zone with a vertical longitudinal axis.

6. A process as claimed in claim 1 wherein said zone is a downwardly conically flaring zone with a vertical longitudinal axis, the smaller, inlet end of said zone being the upper end thereof.

7. A process as claimed in claim 1 wherein the volume ratio of said liquid and said gas is in the range of 0.1:1 to 10:1.

8. A process as claimed in claim 1 wherein the velocity of said gas injected into said impulse exchange zone is 3 to 30 meters per second.

9. A process as claimed in claim 8 wherein the velocity of said liquid injected into said impulse exchange zone is in the range of 10 to 30 meters per second.

10. A process for oxidation of organic compounds with a gas containing molecular oxygen by injecting said gas and a liquid organic compound concurrently into a body of a liquid medium contained within a reaction chamber, which process comprises introducing said gas and said liquid at a velocity of said liquid of 5 to 100 meters per second through at least one nozzle into an impulse exchange zone consisting of a tubular member submerged in the liquid medium, said tubular member being cylindrical or conically flaring in the downstream direction with the axis thereof extending in the direction of entry of said liquid into said zone, the volume of said impulse exchange zone being $1/100$ to $1/100,000$ of the volume of the reaction chamber, the mean diameter of the inlet opening of said tubular member being twice to twenty times the mean diameter of said nozzle for said liquid and the length of said tubular member being three to thirty times its hydraulic diameter.

11. A process for mixing a gas and a liquid with the liquid medium which comprises simultaneously injecting said gas and said liquid into a body of said liquid medium contained within a reaction chamber through at least one nozzle at a velocity at the entrance into the liquid medium of 5 to 100 meters per second into an impulse exchange zone, said zone being defined by a cylindrical or conically flaring tube submerged in said body of liquid, the volume of said impulse exchange zone being $1/100$ to $1/100,000$ of the volume of the reaction chamber, the mean diameter of the inlet opening of the tube being twice to twenty times the mean diameter of the nozzle for the liquid, the length of the tube being three to thirty times its hydraulic diameter and the longitudinal axis of said tubes being oriented in the liquid medium in the direction of discharge of said liquid from said nozzle.

References Cited

UNITED STATES PATENTS

| 3,255,240 | 6/1966 | Wolfram | 260—513 |
| 3,132,156 | 5/1964 | Lemon | 260—451 |
| 3,115,527 | 12/1963 | Drimus | 23—285 |
| 2,865,958 | 12/1958 | Davies | 260—513 |
| 2,223,494 | 12/1940 | Loder | 260—586 B |
| 2,938,924 | 5/1960 | Simon et al. | 260—586 B |

OTHER REFERENCES

Leverspiel, "Chemical Reaction Engineering," pp. 126–129 and 139, John Wiley & Sons, 1962.

LEON ZITVER, Primary Examiner

N. MORGENSTERN, Assistant Examiner

U.S. Cl. X.R.

23—252, 285, 288 E, 271; 259—4, 95; 260—631 R, 687; 261—76, 77, 121, 123

UNITED STATES PATENT OFFICE
CERTIFICATE OF CORRECTION

Patent No. 3,755,452           Dated August 28, 1973

Inventor(s) Richard Sinn et al

It is certified that error appears in the above-identified patent and that said Letters Patent are hereby corrected as shown below:

First page, left-hand column, tenth line, insert
-- [30]     Foreign Application Priority Data
      April 9, 1966    Germany....... B 86601 --.

Column 2, line 59-60, "mean residence amount of catalyst" should read -- mean residence time, degree of oxidation, pressure, temperature and amount of catalyst --.

Column 3, line 59, delete "to one-hundredth".

Column 4, line 11-12, "chember" should read -- chamber --.

Column 6, line 31, "tubes" should read -- tube --.

Signed and sealed this 29th day of October 1974.

(SEAL)
Attest:

McCOY M. GIBSON JR.
Attesting Officer

C. MARSHALL DANN
Commissioner of Patents